(12) United States Patent
Jonkka (10) Patent No.: US 6,516,843 B2
(45) Date of Patent: Feb. 11, 2003

(54) METHOD FOR DEFROSTING LOGS AND A DEFROSTING APPARATUS

(75) Inventor: Arvo Jonkka, Pori (FI)

(73) Assignee: Metso Woodhandling Oy, Pori (FI)

( * ) Notice: Subject to any disclaimer, the term of this patent is extended or adjusted under 35 U.S.C. 154(b) by 0 days.

(21) Appl. No.: 09/898,021

(22) Filed: Jul. 5, 2001

(65) Prior Publication Data

US 2003/0010402 A1 Jan. 16, 2003

(51) Int. Cl.[7] .............................. B27L 1/00; B27M 1/00
(52) U.S. Cl. ................. 144/342; 144/208.1; 144/208.9; 144/380
(58) Field of Search ........................... 144/208.1, 208.9, 144/329, 340, 341, 364, 380, 342; 241/21, 24, 28

(56) References Cited

U.S. PATENT DOCUMENTS

| 979,914 A | * | 12/1910 | Ayer | 144/342 |
| 2,799,308 A | * | 7/1957 | Makinson | 144/342 |
| 3,627,006 A | * | 12/1971 | Swillinger | 144/342 |
| 4,180,109 A | * | 12/1979 | Heikkinen | 144/208.9 |
| 4,784,197 A | * | 11/1988 | Alander et al. | 144/342 |
| 5,103,883 A | * | 4/1992 | Viikari et al. | 144/380 X |
| 5,197,524 A | * | 3/1993 | Clarke-Pounder et al. | 144/342 |
| 6,173,748 B1 | * | 1/2001 | Paani | 144/340 |

FOREIGN PATENT DOCUMENTS

| FI | 26 670 | 6/1954 |
| FI | 3735/74 | 6/1975 |
| FI | 3497/68 | 8/1976 |
| FI | 19992384 | 5/2000 |

OTHER PUBLICATIONS

*Thermal Conductive Properties of Wood, Green or Dry, From –40° to +100° C.*: A Liturature Review, USDA Forest Service General Technical Report FPL–9, 1977, pp. 1–10.
*Heating Frozen and Nonfrozen Veneer Logs*, O. Feihl, Forest Products Journal, vol. 22, No. 10, Oct. 1972, pp. 42–50.
*Upptining Av Frusen Ved*, Sevenska Forskningslabora Toriet, Report 549, Nov. 7, 1966, pp. 1–19.
*Upptining Av Frusen Ved*, Sevenska Forskningsilabora Toriet, Report 575, Nov. 7, 1966, pp. 1–19 (with partial translation).
*Oppvarming Og Rengjoring Av Skurtommer for Barkning*, Kierrulf, R., Tronstad, S., Norsk Treteknisk Institut, Rapport, Jun. 1979, pp. 1–18.

* cited by examiner

*Primary Examiner*—W. Donald Bray
(74) *Attorney, Agent, or Firm*—Burns, Doane, Swecker & Mathis, LLP (57) ABSTRACT

The present invention concerns a method and an apparatus for defrosting frozen wood prior to debarking. The defrosting method of logs of the invention is based on bringing heat zone-specifically to logs in transfer motion on a conveyor according to their heat receiving capacity immediately from the moment of starting of the defrosting, and at the end of the defrosting process, the heat volume per time unit, supplied at a higher temperature, is only a part of the heat volume of the starting phase of the defrosting process. For instance, it is possible to spray water on the wood to be defrosted so that the row interval of the showers in the initial part of the piping is a fraction of the row Interval in the tail end of the piping. In the tall end of the defrosting conveyor steam can also be supplied.

10 Claims, 8 Drawing Sheets

METHOD FOR DEFROSTING LOGS AND A DEFROSTING APPARATUS

BACKGROUND OF THE INVENTION

The present invention concerns a method and an apparatus for defrosting frozen logs before debarking. The large production volume of the present wood debarking lines also with frozen logs requires effective defrosting prior to the debarking in a drum. The defrosting conveyor used for this purpose is an expensive apparatus taking a lot of space, its size being dependent on the required defrosting time.

With the defrosting conveyors of prior art, the defrosting is usually implemented so that water of a certain temperature is sprayed on the stream of logs moving on the conveyor. The defrosting is intensified by decreasing the speed of the conveyor, by properly filling up the conveyor, or by increasing the length of transport during the defrosting. Usually, the amount of energy available for defrosting is stable during the whole defrosting process.

According to an older defrosting process, the debarking drum comprised a starting sector with no bark openings, partly filled with water, into which warm water was pumped in the winter time. Due to water pollution problems, these so called wet-debarking drums have today been abandoned. There are presently also various ways of supplying energy, depending on the mill. In new mills, the defrosting energy is delivered by means of a large amount of water of a relatively low temperature, by means of a small amount of water with high temperature, by means of superheated, pressurised water, or by steam.

In the transverse conveyor system of Swedish origin, the defrosting is implemented in two phases, wherein the log bundles initially are defrosted as a large pile, and after the pile has been lowered, an effective after-defrosting takes place.

Experience shows, that a defrosted layer of about 10 mm from the bark surface of the log is required to achieve a good debarking result. It is, however, difficult to provide defrosting evenly for the whole log layer to be transported. Especially large logs are only partly defrosted, and with temperatures of several degrees below zero, the logs freeze again, because the cold heartwood forms a prominent part of the log. There are also problems with the logs on the bottom of the log pile, which are defrosted only by the colder water.

The process of defrosting logs, including heat transmission and temperatures of different wood layers, has been described in the following publications, among others:

*Thermal Conductive properties of wood, Green or Dry,* USDA Forest Service General Technical Report FPL-9

*Heating Frozen and Nonfrozen 1977 Veneer Logs,* Forest Products Journal 1972 Vol 22. No. 10

*Oppvarming og rengjöring av skurtömmer för barkning,* Norsk Treteknisk Institut Rapport Juni 1979

*Upptining av frusen ved,* Svenska Forskningslaboratonet, report 549, 11.07.1966 and report 575, 16.11.1966.

SUMMARY OF THE INVENTION

The log defrosting method according to the present invention is based on zone-specifically providing heat to the logs in transfer motion on a conveyor, according to their heat receiving capacity immediately from the moment of starting of the defrosting, and at the end of the defrosting process, the amount of heat provided per time unit (length of path) is only a fraction of the amount of heat in the first defrosting phase. Preferably, the heat amount ratio is about 5:1. The defrosting conveyor can be divided into 3 to 10 defrosting zones with a length of, for example, 2–10 meters each. Application of the present invention is particularly suitable for the energy delivery methods mentioned on page 1. By means of the invention, the defrosting energy can be more efficiently utilised, and at the same time water pollution is decreased.

The above mentioned invention is based on the following starting values received from the reference literature:

Heat transmission to the surface of the logs is restricted by the surface resistance.

| | |
|---|---|
| Water flushing | 1000–2000 KJ/m$^2$h° C. |
| (Heat transmission in heat exchangers 6000 KJ/m$^2$h° C.) | |
| Water bath | 400–800 KJ/m$^2$h° C. |
| Steam | 300–600 KJ/m$^2$h° C. |
| Moving air | 50–100 KJ/m$^2$h° C. |
| Air | 20–50 KJ/m$^2$h° C. |

Thermal conduction from the surface of the logs through the bark and into the wood, causing melting of ice. Thermal conductivity of wood—1 KJ/m$^2$h° C. (Moisture 50%, old value 0.24 kcal/m$^2$h° C.).

Based on the foregoing, the thermal conductivity to different depths from the surface of the log can be calculated.

| | |
|---|---|
| 0.5 mm | 2000 KJ/m$^2$h° C. |
| 1 mm | 1000 KJ/m$^2$h° C. |
| 2 mm | 500 KJ/m$^2$h° C. |
| 5 mm | 200 KJ/m$^2$h° C. |
| 10 mm | 100 KJIm$^2$h° C. |
| 50 mm | 20 KJ/m$^2$h° C. |

Based on the heat transmission value and the thermal conductivity to the layer to be defrosted, the surface temperature of the log can be calculated, which gives the probable defrosting depth. At the end of the defrosting process, when the defrosted layer is 10 mm thick, the wood surface receives only about 5% of the heat amount of the starting phase of the defrosting process.

According to the new, intensified defrosting method, heat is brought zone-specifically, according to their heat receiving capacity, to the logs to be defrosted while the logs being transported on a conveyor and the total heat amount is increased in a restricted manner, only as a result of better defrosting.

BRIEF DESCRIPTION OF THE FIGURES

The present invention and its details will be explained in more detail in the following, with reference to the enclosed drawings, wherein.

DETAILED DESCRIPTION OF THE INVENTION

Figure 1:
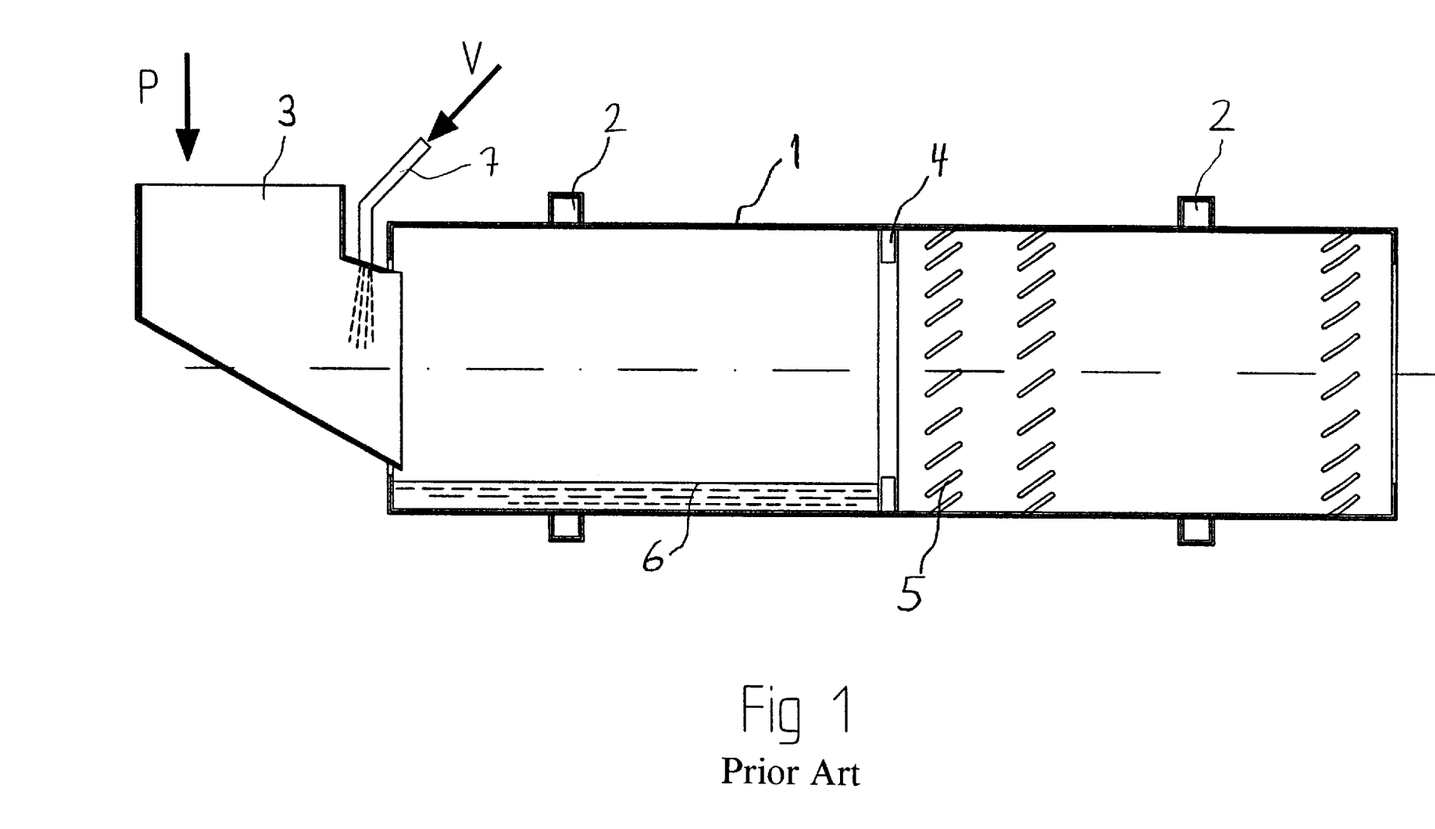
FIG. 1 shows a defrosting and debarking method of logs used in the sixties and seventies.

FIG. 1 shows an old debarking method, used in the sixties and seventies, whereby in connection with the so called wet-barking in drum 1, the water contamination degree is considerably high. There are no logs shown inside the debarking drum of FIG. 1, and the rotating drum section is supported by two supporting rings 2. The logs are fed into the drum by means of a feeding chute 3 and also water is continuously pumped into the drum through a pipe 7. The initial part of the drum is water-tight, and the defined water level 6 is maintained by a water ring 4. Bark and surplus water are discharged through a bark opening 6.

In winter time, hot water must be used for defrosting the logs, which increases the dissolution of water contaminating bark substances.

Figure 2:
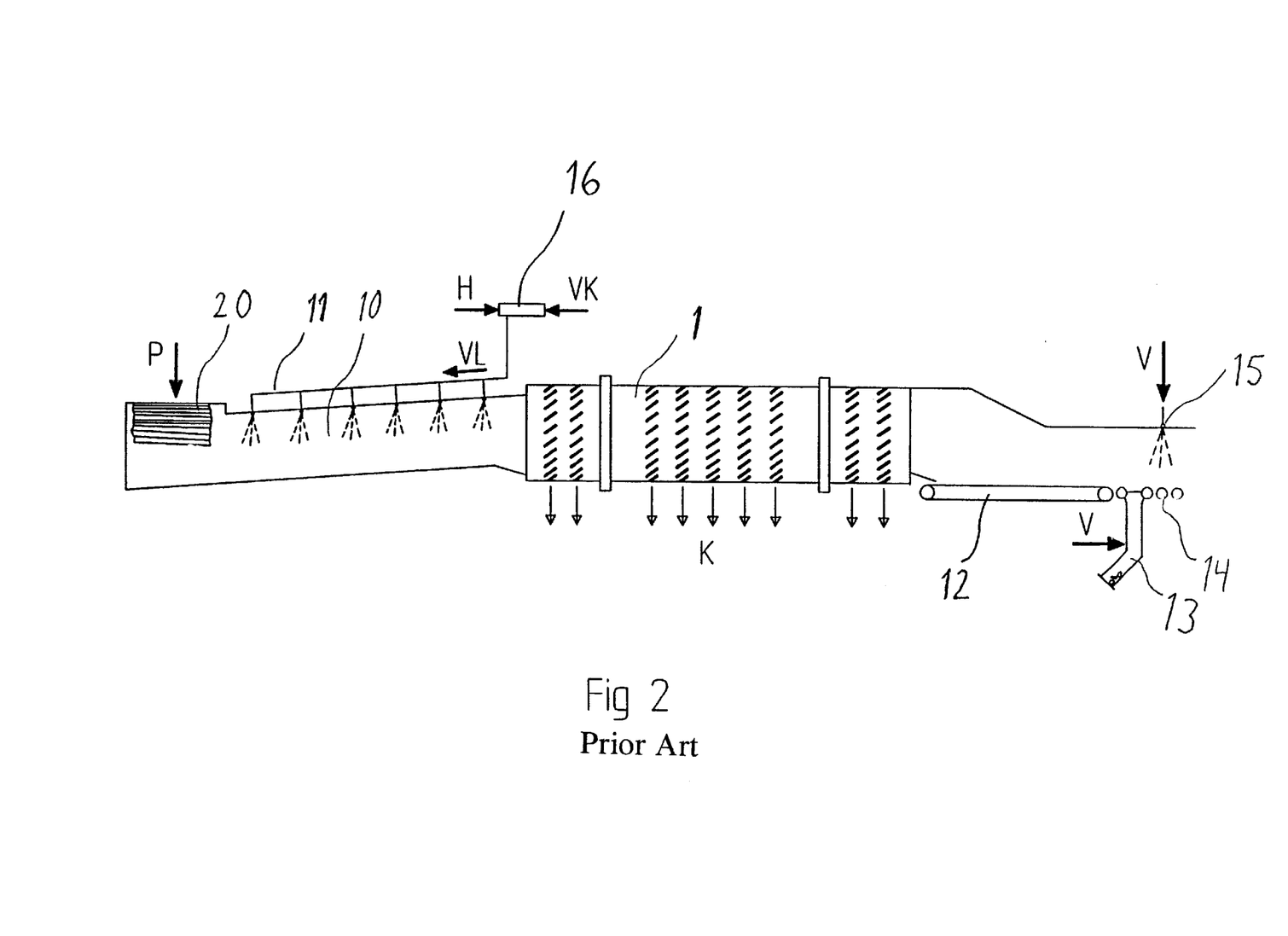
FIG. 2 shows a defrosting conveyor and a debarking method of prior art.

FIG. 2 shows a debarking process developed for northern conditions due to the above mentioned considerable sedimentation problems of water, said method presently being the most commonly used for frozen logs. A defrosting conveyor 10 usually feeds whole log bundles into barking drum 1. The logs 20 to be debarked are fed to the defrosting conveyor as shown by arrow P, and the warm defrosting water VL is sprayed on the conveyor 10 through piping 11. Cold water VK is led to an ejector heat exchanger 16, where steam H Is fed thereto After the barking drum 1 there is provided a receiving conveyor 12 and a roller 14, between the rolls of which is provided a water stone trap 13. On top of the roller there is a spray water pipe 15, by means of which the waste barks are washed from the logs.

Figure 3:
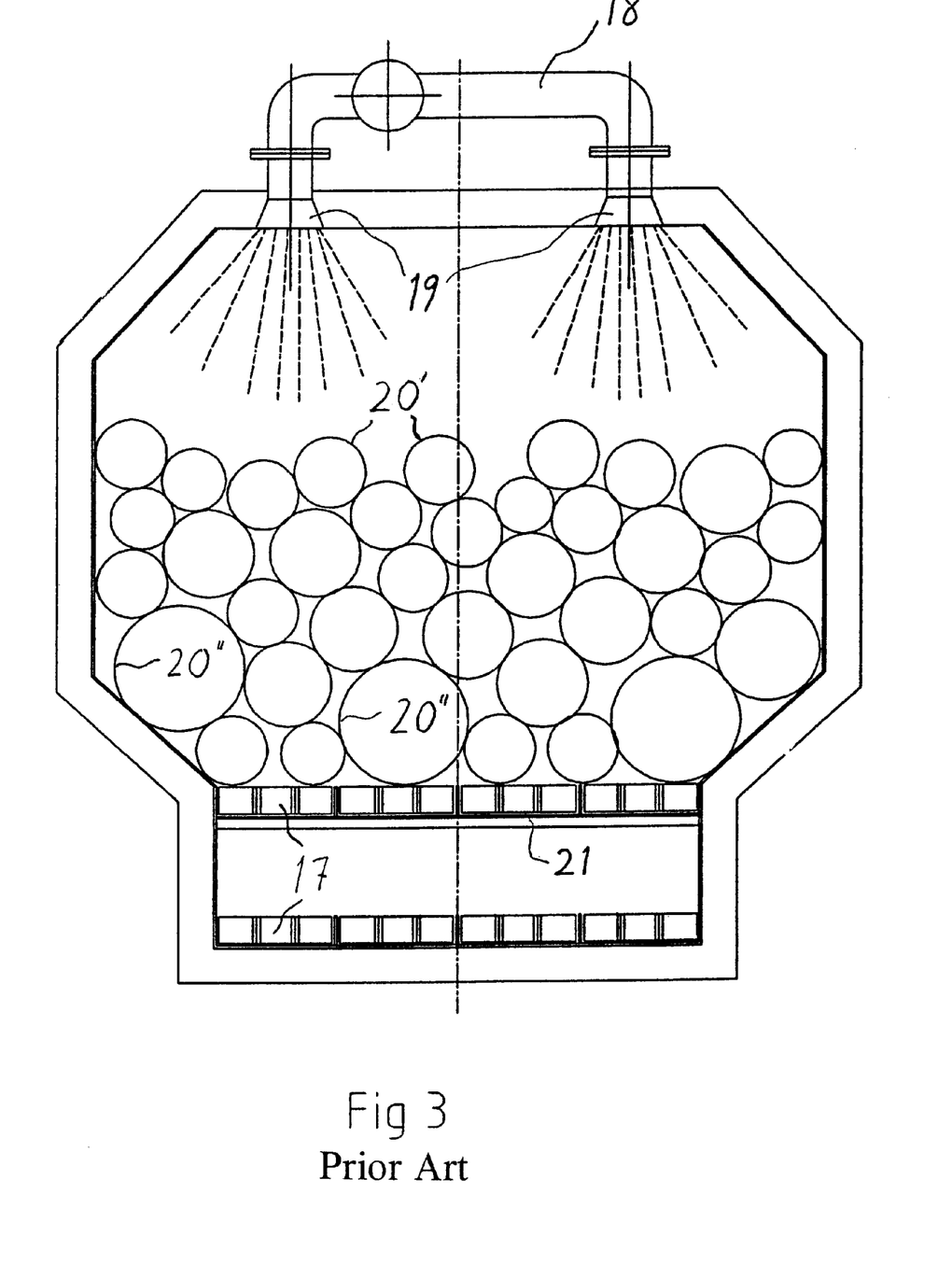
FIG. 3 shows cross section A—A of FIG. 2.

FIG. 3 shows the cross section A—A of a defrosting conveyor of a chain conveyor type of FIG. 2, whereby four conveyor chains 17 are provided in the lower part of the conveyor 10, and distribution pipes 18 and spray nozzles 19 are provided in the upper part thereof.

In the defrosting conveyor of FIG. 3, melt water runs along intermediate deck 21 to the lower end of the conveyor. Logs 20 do not usually touch the return water, as they rest on chains 17. Thus, the largest logs 20" on the bottom are subject to a prominently lower defrosting effect than the smaller logs 20' on top. The temperature of the return water is generally 15–20° C. lower than the supply water coming from the sprays 19. The supply water is for instance +50° C. and the return water +32° C.

Figure 4:
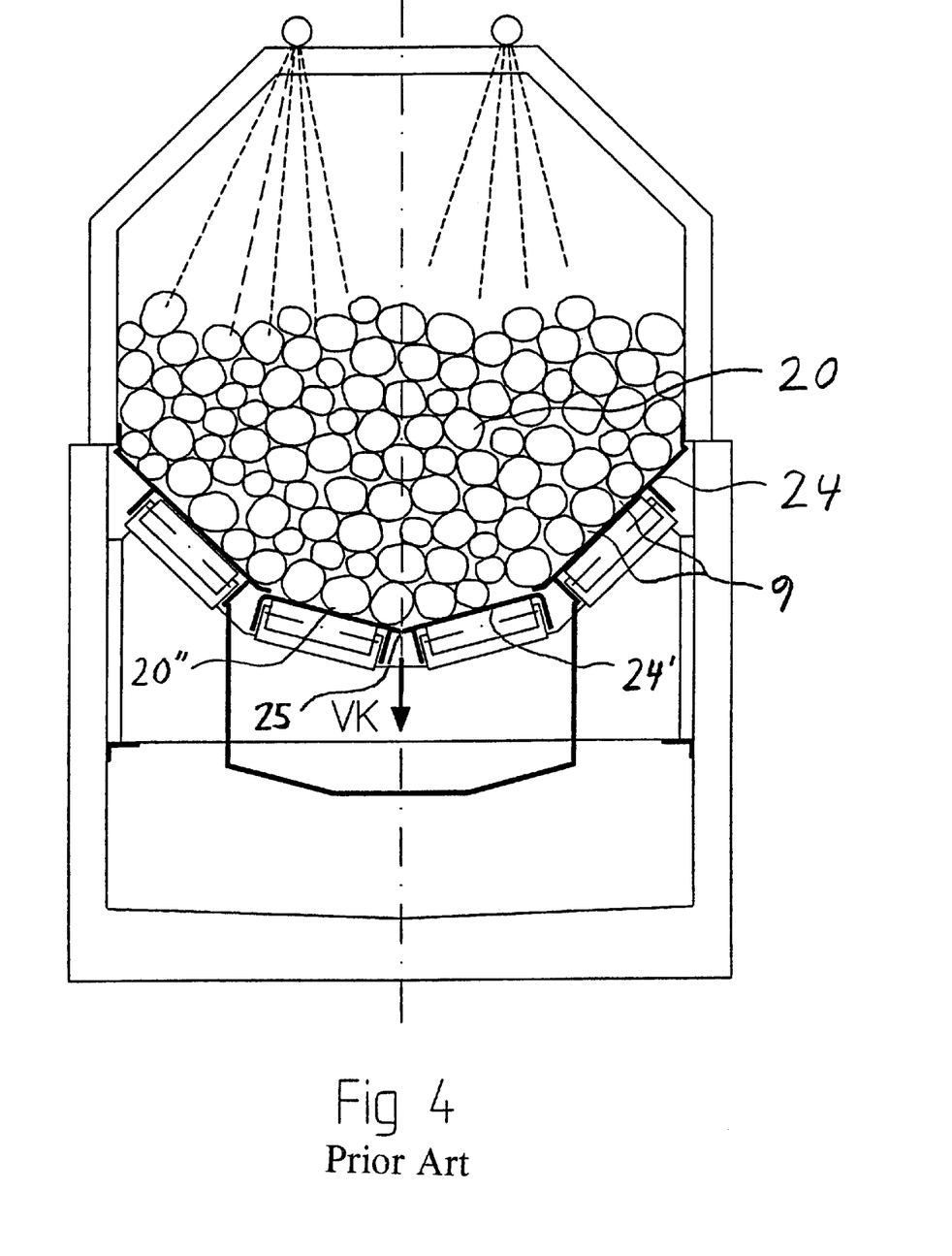
FIG. 4 shows cross section A—A of FIG. 2 with a defrosting conveyor of prior art, of an other type.

A defrosting conveyor of the new type of FIG. 4 moves the logs by means of movable beams 24. Between the beams 24' in the middle, there is a slot 26, for discharging the water sprayed over the logs. Temperature measurements with the defrosting conveyor of FIG. 4 show, that the temperature of the water discharged between the beams 24' in the initial part of the defrosting tunnel is lower than +5° C. and at the tail end about +38° C. In conclusion. it can be said that the initial defrosting speed of a large log on the bottom of the conveyor is very low, because it takes place with cold water at the level of +10° C.–+5° C. In very cold weather, the cooled defrosting water can even freeze onto a large log on the bottom of the bundle. With an apparatus of FIG. 4, the defrosting is intensified also when logs 20 are resting on the supporting deck, whereby water runs downwards along the rising conveyor in the pockets 9 formed by the beam bottom and the logs.

Figure 5:
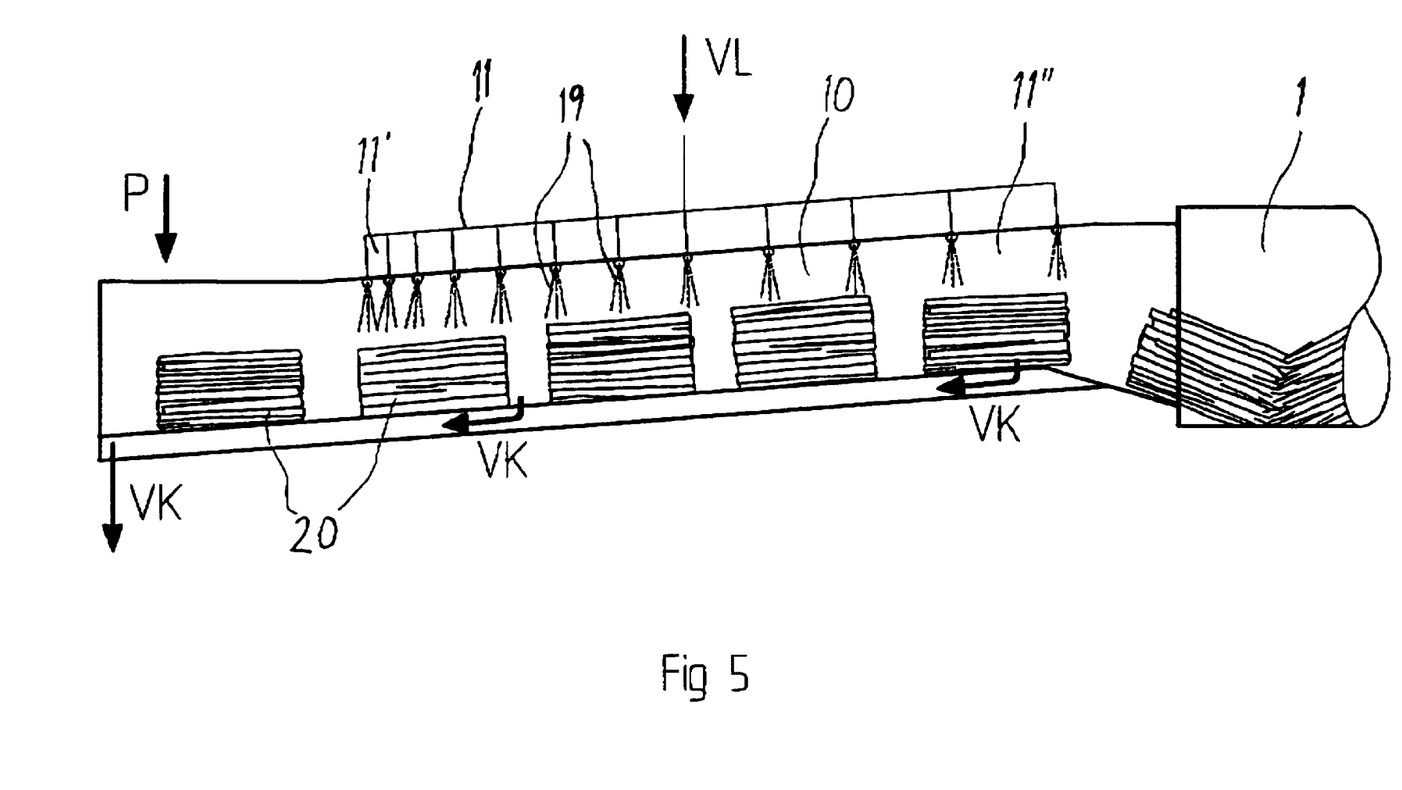
FIG. 5 shows an apparatus implementing the defrosting method of the present invention.

In the during-transport defrosting method in accordance with the present invention, shown in FIG. 5, the observed problems have been taken into account. The defrosting water pipes 11 are so designed, that the amount of heat brought to the initial part of the defrosting conveyor is a multiple in relation to the heat amount brought to the tail end of the conveyor. For instance, the row interval of spray nozzles 19 in the initial part 11' can be a fraction of their row interval at the tail end 11" of the piping. It is thereby assumed, that all water showers are equal in respect of water volume, and that only one temperature of defrosting water is available. Preferably, the row interval in the forepart is one fifth of the row interval of the tail end 11". Alternatively, a larger nozzle size or warmer water can be used, or even steam can be fed from the bottom. In this method of the present invention, the heat volume supplied to the initial part of the defrosting tunnel Is so large, that it 10 corresponds to the heat receiving capacity of the logs, and the temperature of the discharged water does not fall prominently even in the starting phase of the defrosting. Thereby also the large logs at the bottom of the bundle defrost to such an extent, that they are efficiently debarked.

Figure 6:
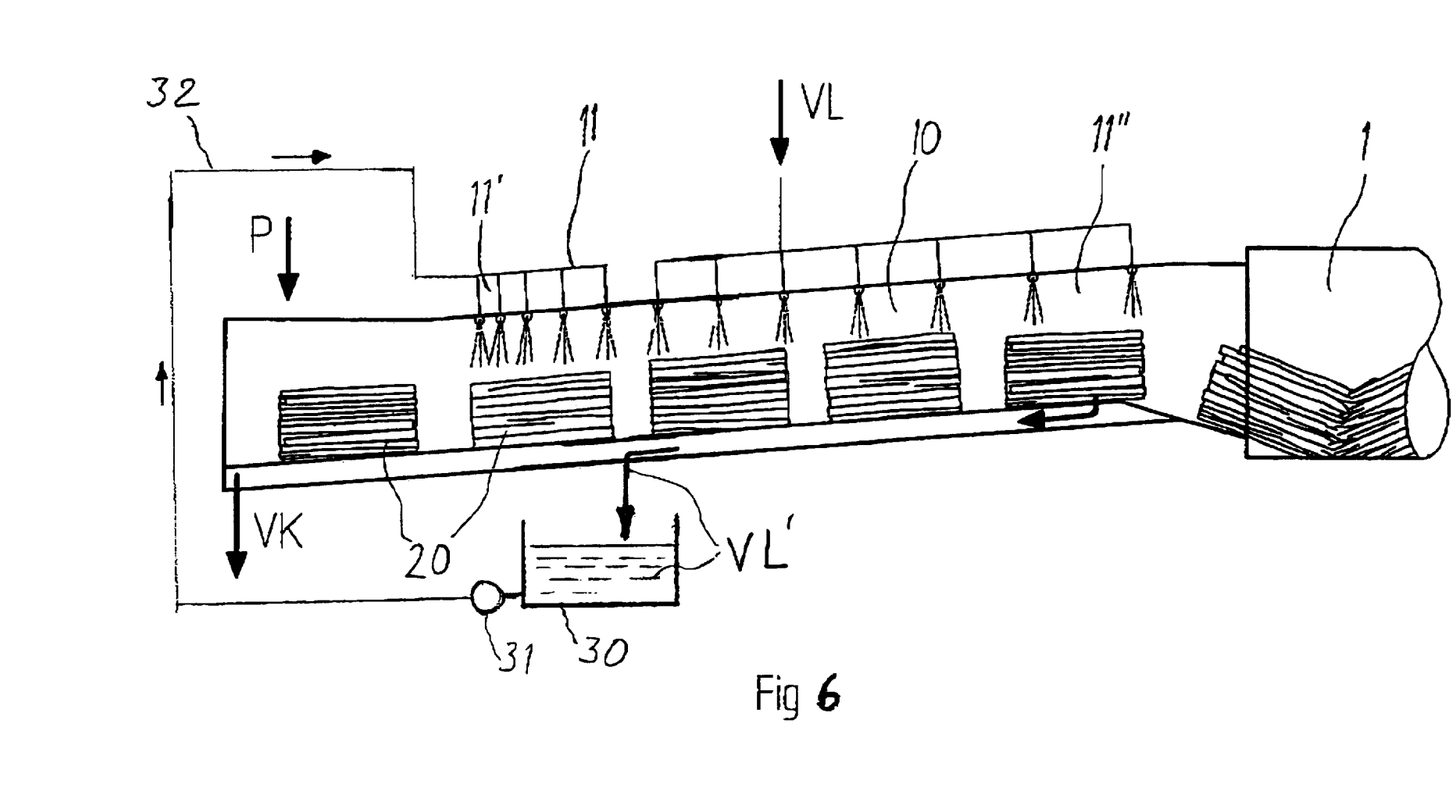
FIG. 6 shows an alternative embodiment of the present invention.

FIG. 6 shows an embodiment of the defrosting method of FIG. 5, whereby the defrosting must be performed by means of a small volume of very hot water, the heat amount of which must be efficiently released. The warm water VL is brought to nozzles 11" of the tail end of the defrosting conveyor, after which it is discharged into a basin 30 at a temperature VL', after releasing a part of its energy. Half warm water VL' is pumped to the initial part nozzles 11' by means of a pump 31 and piping 32 that spray a significant amount of water on the logs during a short trip. A significant advantage is gained by means of a log defrosting method of FIG. 6, in accordance with the present invention, compared with methods of the prior art. In present plants, a small water amount with additional energy is mixed into a large amount of colder circulation water.

Figure 8:
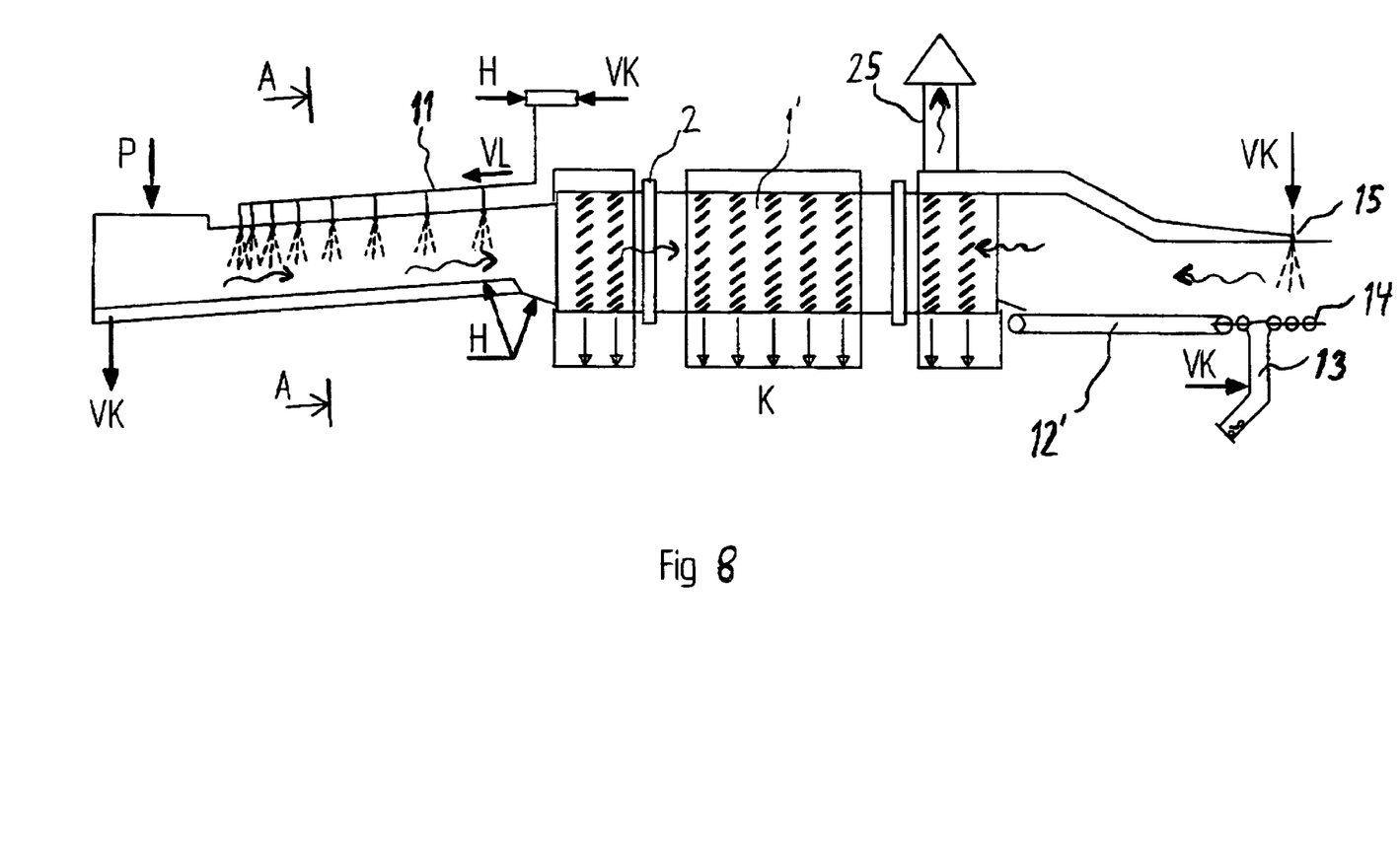
FIG. 8 shows an apparatus Implementing the defrosting method of the present invention, using water and steam.

FIG. 8 shows one alternative intensified defrosting of logs in connection with their transport and feeding into the drum, whereby water and steam are used and the defrosting process also continues inside the debarking drum. As it is clear from the above mentioned defrosting basics, steam is capable of releasing enough heat after the log surface has melted. As shown in FIG. 8, steam H is supplied to the initial part of the debarking drum and to the tail end of the defrosting conveyor, thereby continuing the defrosting. Steam formed in the defrosting tunnel is directed into drum 1' by means of a blower 25 at the tail end of the drum, which is equipped with sealed and covered bark ramps. Further, also when the temperature of the cold water VK is relatively high, steam is formed in the stone trap 13, washer roller 14 and wash water spray 15. As the receiving conveyor 12' is covered (also due to noise problems), a main part of this steam is carried into debarking drum 1 and blower 25. Through a method in accordance with FIG. 8, efficient heat transmission from steam and air to the wood to be debarked is achieved, also following defrosting. An advantageous consequence thereof is that a higher bark temperature is achieved, leading to the advantage of easier dewatering when compressing the bark.

Supervision problems due to the condensation of steam at the receiving conveyor 12 can be prevented by blowing hot air into critical areas.

The combined water-steam supply can also be replaced by a combination of water and "superheated" water, whereby the temperature of the warmer water is from 20° C. to 30° C. above the defrosting water temperature in the initialpart, or even exceeding 110° C.–130° C. Thereby warmer water Is supplied in, relatively, very small amounts according to its heat release capacity, to the tail end of the defrosting conveyor 10 by means of separate piping, which can have for instance only one shower row in the middle of the conveyor. The hot water of more than 100° C. vaporises immediately after being discharged from the shower, and the steam can be directed to the drum as described above.

The method in accordance with the present invention provides efficient defrosting of large logs also among small logs. Also, birch logs for pulp production that usually defrost slowly, can be properly defrosted. In addition, the most significant advantage of the invention is, that the defrosting time and thereby also the defrosting path length can be shortened. At present, the defrosting prior to debarking takes about 20 minutes for softwood and 30 minutes for birch wood. In practice, about 75 MJ/k-m$^3$ (solid cubic meter of unbarked wood) is required for defrosting of softwood for debarking. With a temperature difference of 40° C. compared with the frozen surface of the wood, this means that pulp wood with Ø 130 mm can initially receive heat so rapidly, that the defrosting time would be about two minutes. Thereby the surface area of the wood is calculated to be 30 m$^2$/k-m$^3$ and the medium heat release capacity 2000 KJ/m$^2$h° C.

After the defrosting of the wood surface, however, the heat receiving capacity of the wood slows down, because its temperature rises. Thereby the available temperature difference is divided between heat transfer and thermal conduction. At the end phase of defrosting, the wood surface temperature rises near the temperature of the defrosting water and almost the whole temperature difference is used for thermal conduction from the surface to the frozen layer.

Figure 7:
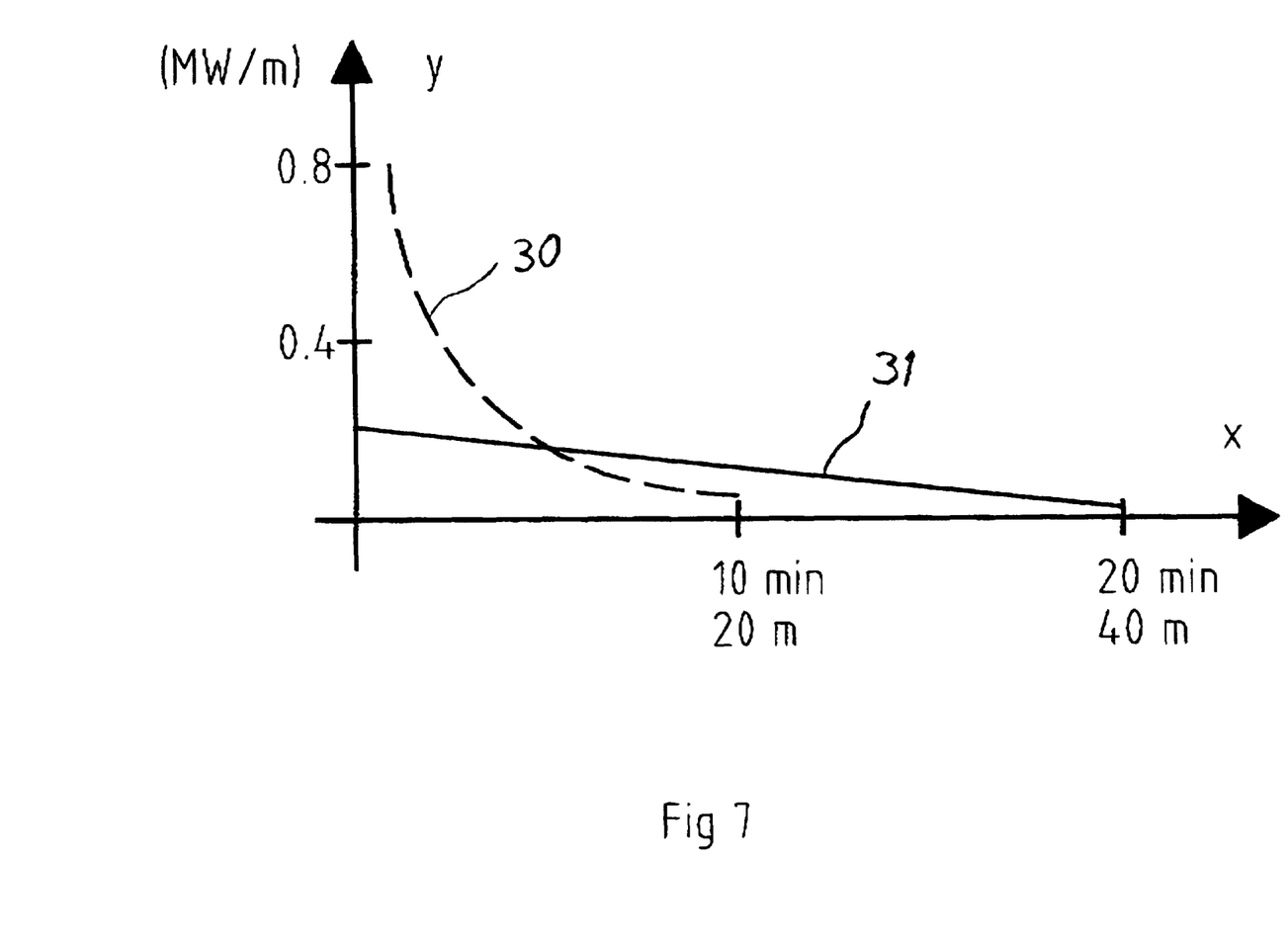
FIG. 7 describes differences between the method of prior art and the present invention.

FIG. 7 shows the difference between a manner of defrosting on a defrosting conveyor in accordance with the present invention and a corresponding traditional defrosting of the prior art, whereby a considerable shortening of defrosting time, that is a shortening of about 50%, can be achieved by using a multiple amount of heat per meter conveyor length. The vertical axis of the figure shows the defrosting capacity y and the horizontal axis the defrosting time or length x. The energy transmission of the intensified defrosting is indicated by the dashed line 30 and that of traditional defrosting by the solid line 31.

The functionality of the method in accordance with the present invention is confirmed by, in addition to the measurements of the water temperature of the defrosting conveyor of FIG. 4, also by the above mentioned publications by Svenska Forsknigslaboratoriet. Report No 549 of 11.7.1966 and Report No 575 of 16.11.1966. Page 8 and FIG. 5.2 of the last mentioned report corresponds, from a different point of view, to the curve of FIG. 7 which represents the transfer of defrosting heat as a function of time. The mentioned publications, however, do not teach how the defrosting conveyor, the optimal heat supply or the shower piping thereof should be designed, and for this reason the defrosting conveyor systems of the prior art are inefficient.

The present defrosting conveyor systems do not provide ideal defrosting heat transmission, which leads to an excessive defrosting time. The present invention provides optimal defrosting and a minimal defrosting time.

What is claimed is:

1. A method of defrosting logs to be debarked, comprising:

transporting the logs to be defrosted on a defrosting conveyor, defrosting the logs along a travel path of the defrosting conveyor, said defrosting step including an initial phase of defrosting along an initial part of the conveyor and an end phase along a tail end part of the conveyor, said defrosting step including applying heat to the logs by means of hot water or steam, providing zone-specific amounts of heat to the logs based upon a predetermined heat receiving capacity of the logs wherein in the initial phase of defrosting, a multiple amount of heat is applied to the logs per unit time as compared to the end phase of defrosting.

2. A method as claimed in claim 1, wherein said defrosting step is performed with a varying amount of water per unit of length.

3. A method as claimed in claim 2, wherein the zone-specific amount of water supplied to the initial part of the defrosting conveyor is about five times as large as the amount of water supplied in the tail end part of the conveyor.

4. A method as claimed in claim 1, wherein in the initial part of the defrosting conveyor, a large amount of water is supplied, and in the tail end part of the defrosting conveyor, steam is supplied for defrosting.

5. A method as claimed in claim 1, further comprising supplying steam to a barking drum.

6. A method as claimed in claim 5, wherein the steam is generated from pressurised water with a temperature of more than 100° C., supplied to a tail end of the barking drum.

7. A method as claimed in claim 4, wherein the steam is extracted from the tail end of a barking drum by a blower.

8. A device for transporting and defrosting frozen logs comprising, a defrosting conveyor system provided with means for spraying at least one of water and steam, said defrosting conveyor system defining an initial part and a tail end part, wherein, in the initial part of the defrosting conveyor system, said water spraying means have a multiple capacity as compared with those of the tail end part of the conveyor system.

9. A device as claimed in claim 8, wherein in the initial part of the defrosting conveyor system a capacity of the water spraying means is about five times as large as that of the water spraying means of the tail end part of the defrosting conveyor system.

10. A device as claimed in claim 8, further comprising means for supplying steam to at least one of the defrosting conveyor system and a barking drum.

* * * * *